United States Patent
Gilron et al.

(10) Patent No.: US 10,392,279 B2
(45) Date of Patent: Aug. 27, 2019

(54) EDUCTOR-BASED MEMBRANE BIOREACTOR

(71) Applicants: Scientific Associates, Greensboro, NC (US); B.G. Negev Technologies and Applications Ltd., Beer-Sheva (IL)

(72) Inventors: Jack Gilron, Beer Sheva (IL); Shibam Mitra, ZIWR Sede Boker Campus (IL); Naphtali Daltrophe, Beer Sheeva (IL)

(73) Assignees: Scientific Associates, Greensboro, NC (US); B.G. Negev Technologies and Applications Ltd., Beer-Sheva (IL)

( * ) Notice: Subject to any disclaimer, the term of this patent is extended or adjusted under 35 U.S.C. 154(b) by 270 days.

(21) Appl. No.: 14/596,544

(22) Filed: Jan. 14, 2015

(65) Prior Publication Data
US 2016/0200607 A1    Jul. 14, 2016

(51) Int. Cl.
*C02F 3/06* (2006.01)
*C02F 3/12* (2006.01)
(Continued)

(52) U.S. Cl.
CPC ............... *C02F 3/06* (2013.01); *B01D 63/02* (2013.01); *B01D 63/08* (2013.01); *C02F 3/1273* (2013.01); *C02F 3/1294* (2013.01); *B01D 2311/25* (2013.01); *B01D 2311/2665* (2013.01); *B01D 2313/50* (2013.01); *B01D 2315/06* (2013.01); *C02F 3/1284* (2013.01); *C02F 2203/006* (2013.01); *C02F 2209/001* (2013.01); *C02F 2209/03* (2013.01); *C02F 2209/22* (2013.01); *C02F 2209/40* (2013.01);
(Continued)

(58) Field of Classification Search
None
See application file for complete search history.

(56) References Cited

U.S. PATENT DOCUMENTS 7,025,883 B1 *  4/2006  Olivier .................. A01K 63/04
                                                           210/602
7,244,356 B2    7/2007  Olivier
(Continued)

OTHER PUBLICATIONS

Park et al., Hydrodynamics and microbial physiology affecting performance of a new MBR, membrane-couples high-performance compact reactor, Jan. 12, 2004, 8 Pages, Elsevier.

*Primary Examiner* — Patrick J Orme
(74) *Attorney, Agent, or Firm* — Finnegan, Henderson, Farabow, Garrett & Dunner, LLP

(57) ABSTRACT

A process for treating domestic wastewater may include directing wastewater into a tank containing a membrane filter and mixed liquor. The process may include recirculating wastewater and mixed liquor from a top end of the tank into a bottom end of the tank via a recirculation conduit. The process may include introducing a flow of wastewater and mixed liquor from the recirculation conduit into an aeration device and drawing ambient air into the aeration device using the flow of wastewater and mixed liquor from the recirculation conduit. The process may also include drawing wastewater and mixed liquor proximately surrounding the aeration device into the aeration device using the flow of wastewater and mixed liquor from the recirculation conduit. The process may include aerating a mixture of wastewater and mixed liquor with the ambient air below the membrane filter.

20 Claims, 10 Drawing Sheets

(51) Int. Cl.
*B01D 63/02* (2006.01)
*B01D 63/08* (2006.01)

(52) U.S. Cl.
CPC .......... *C02F 2303/20* (2013.01); *Y02W 10/15* (2015.05); *Y02W 10/37* (2015.05)

(56) References Cited

U.S. PATENT DOCUMENTS

| | | |
|---|---|---|
| 7,306,733 B2 | 12/2007 | Olivier |
| 7,442,306 B2 | 10/2008 | Olivier |
| 7,481,935 B2 | 1/2009 | Olivier |
| 7,731,163 B2 | 6/2010 | Olivier |
| 2006/0231497 A1* | 10/2006 | O'Brien ................ C02F 1/5254 210/721 |
| 2010/0264080 A1* | 10/2010 | Livingston ............ C02F 3/1273 210/605 |
| 2011/0089013 A1* | 4/2011 | Sakurai ............. B01D 17/0205 201/2 |
| 2011/0089108 A1* | 4/2011 | Zigerlig ................ C02F 3/1268 210/626 |
| 2013/0153493 A1* | 6/2013 | Young ...................... C02F 3/06 210/615 |

* cited by examiner

EDUCTOR-BASED MEMBRANE BIOREACTOR

TECHNICAL FIELD

The present disclosure is directed to a membrane bioreactor and, more particularly, to a membrane bioreactor that implements an eductor for reducing a rate of membrane fouling.

BACKGROUND

Membrane bioreactors (MBR) have been utilized in wastewater treatment processes to reduce contaminants in domestic wastewater using a combination of biological treatment and physical separation by membrane filtration, MBR processes have significant advantages over the conventional activated sludge process (CASP). These advantages have led to increased development of MBR processes for use in various fields, including municipal wastewater treatment, landfill leachate treatment, domestic water reuse, and drinking water reclamation. Despite these advantages, high operating costs have prevented wide-spread use of MBR systems in many applications. The costs of MBR systems have remained high in part due to high costs of filter membranes and high costs of mitigating membrane fouling. Membrane fouling mitigation is associated with up to 70% of MBR operating costs. Because filter membranes carry such a high cost, great importance is placed on mitigating membrane fouling to prevent filter membranes from becoming clogged and no longer useable, Known mitigation methods, such as air scouring, promote back-transport of particles from membrane surfaces during MBR operation in order to return trapped particles to bulk solution for treatment, thereby reducing membrane fouling rates. This has traditionally been accomplished using aeration devices, such as diffusers, venturis, and other such nozzles that promote the mixing of air and wastewater while increasing fluid velocities within the system. Although, somewhat effective at reducing membrane fouling rates, known methods of fouling mitigation may not be optimum. For example, known methods of membrane fouling mitigation may not effectively promote back-transport at high enough rates for wide-spread applications of MBR processes. Further, known devices and methods may not efficiently mitigate membrane fouling when wastewater is recirculated at high rates within the system.

An exemplary membrane bioreactor system is disclosed by Park et al. ("Park") in a study published in 2005 titled "Hydrodynamics and microbial physiology affecting performance of a new MBR, membrane-coupled high-performance compact reactor." Specifically, the Park study discloses a membrane bioreactor comprising a submerged hollow fiber membrane near a bottom portion of a tank. A recirculation pump injects mixed liquor, which is a mixture of wastewater and microorganisms that break down organic pollutants, into a two-phase nozzle fitted with a central air tube. Mixed liquor flowing through the nozzle creates a local pressure drop that draws air into the nozzle. The air and mixed liquor form a liquid jet that passes down the draft tube toward the membrane. The liquid jet produces high turbulence and fine air bubbles in the tank.

Although the system of the Park study may be somewhat effective at mitigating membrane fouling under certain conditions, it may become less effective at high recirculation rates. Particularly, it may not effectively mitigate membrane fouling, despite experiencing increased air suction rates, because the aerated wastewater may not promote back-transport at high recirculation rates, thereby still requiring filter membrane replacement. As a result, operation costs due to filter replacement may not be reduced in applications requiring high recirculation rates.

The disclosed system and process address one or more of the problems discussed above and/or other problems of the prior art.

SUMMARY

In one aspect, the present disclosure is directed to a process for treating domestic wastewater. The process may include directing wastewater into a tank containing a membrane filter and mixed liquor. The process may include recirculating wastewater and mixed liquor from atop end of the tank into a bottom end of the tank via a recirculation conduit. The process may include introducing a flow of wastewater and mixed liquor from the recirculation conduit into an aeration device and drawing ambient air into the aeration device using the flow of wastewater and mixed liquor from the recirculation conduit. The process may also include drawing wastewater and mixed liquor proximately surrounding the aeration device into the aeration device using the flow of wastewater and mixed liquor from the recirculation conduit. The process may include aerating a mixture of wastewater and mixed liquor with the ambient air below the membrane filter.

In another aspect, the present disclosure is directed to a membrane bioreactor. The membrane bioreactor may include a reactor tank containing a membrane filter unit submerged in wastewater and mixed liquor. The membrane bioreactor may include a recirculation conduit fluidly connecting a top end and a bottom end of the reactor tank and a recirculation pump disposed in the recirculation conduit. An aeration device may be disposed within the reactor tank and below the membrane filter unit. The aeration device may include a first inlet in fluid communication with the recirculation pump, a second inlet in fluid communication with wastewater and mixed liquor proximately surrounding the aeration device, and a third inlet in fluid communication with an ambient air source.

In another aspect, the present disclosure is directed to a wastewater treatment plant. The plant may include a source of domestic waste water fluidly connected to at least one settling tank. A reactor tank may be fluidly connected to the at least one settling tank and contain wastewater and mixed liquor. The plant may include a recirculation conduit fluidly connecting a top end of the reactor tank to a bottom end of the reactor tank. A membrane filter unit may be disposed within the reactor tank, and an aeration device may be disposed within the reactor tank below the membrane filter unit. The aeration device may be configured to be in fluid communication with the recirculation conduit via a first inlet, with wastewater proximately surrounding the aeration device via a second inlet, and with an ambient air source via a third inlet.

DETAILED DESCRIPTION

Figure 1:
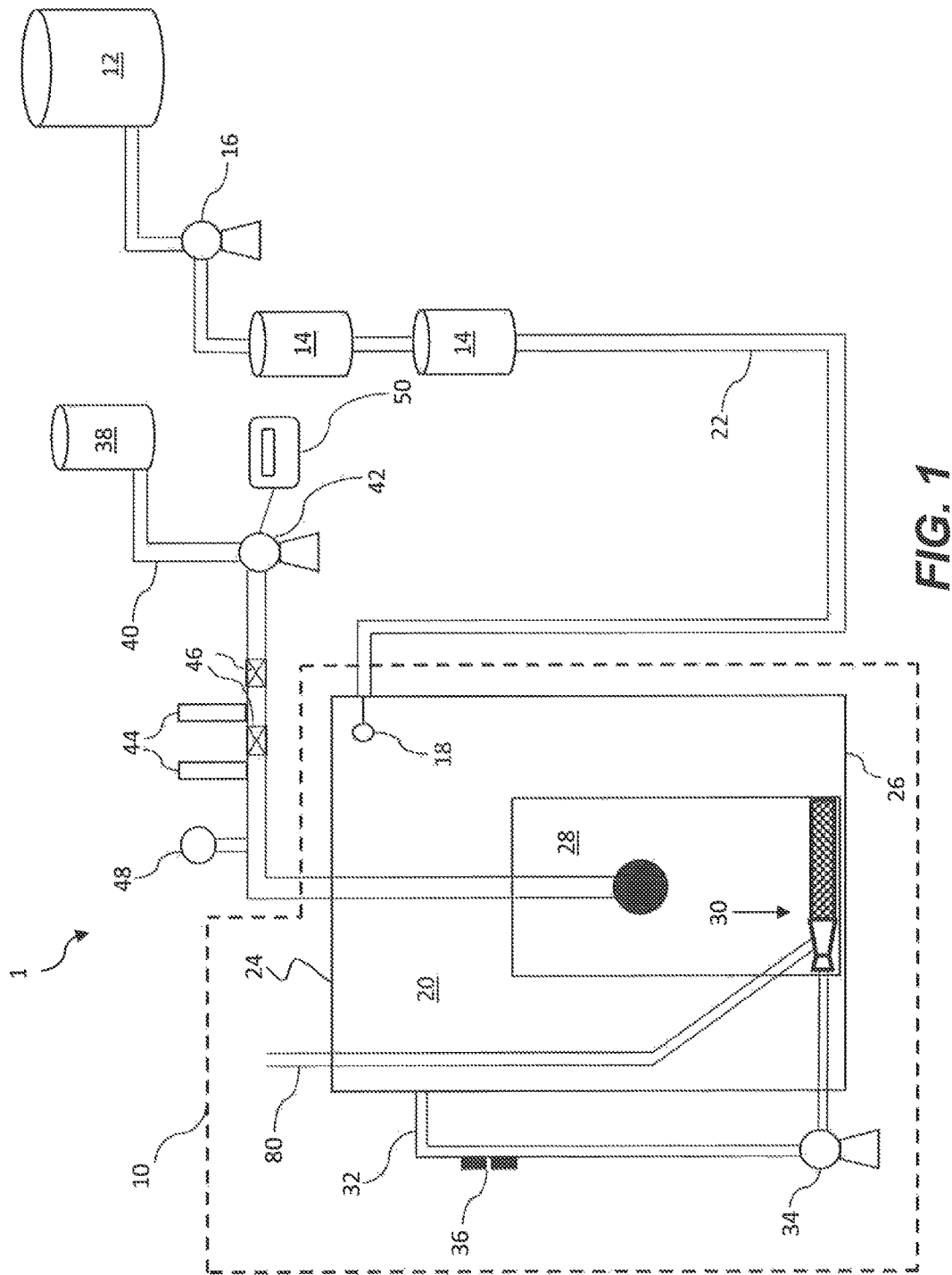
FIG. 1 is a schematic illustration of a wastewater treatment plant incorporating an exemplary disclosed membrane bioreactor system.

FIG. 1 is a diagrammatic illustration of a wastewater treatment plant 1 incorporating an exemplary membrane bioreactor (MBR) system 10. Plant 1 may include a source of wastewater, such as domestic wastewater, may be stored, for example, in a feed tank 12, near MBR system 10. Feed tank 12 may be fluidly connected to one or more settling tanks 14 via a pump 16 for settling wastewater before it enters MBR system 10. Pump 16 may be powered by an electrical grid, battery, solar power system, geothermal power system, or any other suitable source of power. As may be desired in some circumstances, pump 16 may alternatively be powered by a fuel-burning engine or generator. One of ordinary skill in the art would appreciate that pump 16 may be any suitable pump known in the art, Although two settling tanks 14 are shown in FIG. 1, a person of ordinary skill in the art would appreciate that any number of settling tanks 14 may be used. A settling tank 14 may, for example, be located on a roof of a building that houses MBR system 10. En this way, settling tank 14 may be configured to deliver wastewater to a reactor tank 20 of MBR system 10 under the force of gravity and under the control of a float switch 18. A settling tank 1.4 may he located at any suitable location and may incorporate the use of a feed pump to pump wastewater toward MBR system 10. Any suitable source of wastewater may supply wastewater to MBR system 10, such as a pond, lagoon, or other wastewater collection facility.

Reactor tank 20 may he fluidly connected to settling tank 14 via a feed conduit 22. Reactor tank may have a top end 24 opposite a bottom end 26 and may be cylindrical, spherical, rectangular, or any other suitable shape. Reactor tank 20 may he filled with mixed liquor and wastewater from settling tank 14. Reactor tank may also contain a membrane filter unit 28 and an aeration device 30. Float switch 18 may be configured to regulate the flow of wastewater into reactor tank 20 from settling tank 14 and may be generally located near top end 24 of reactor tank 20 and configured to open and close a valve when wastewater in reactor tank 20 falls below a lower limit or exceeds an upper limit. In this way, MBR system. 1.0 may he operated at a generally constant load level, and can he tuned for optimal performance.

Reactor tank 20 may include a recirculation conduit 32 fluidly connecting top end 24 of reactor tank 20 to aeration device 30. A recirculation pump 34 may be fluidly connected to recirculation conduit 32 between top end 24 of reactor tank and aeration device 30 for recirculating mixed liquor and wastewater from top end 24 of reactor tank 20 to aeration device 30. Recirculation pump 34 may be, for example, a centrifugal pump or any suitable pump known in the art. Ultrasonic flow meter 36 may also be fluidly connected to recirculation conduit 32 between top end 24 of reactor tank and aeration device 30. Ultrasonic flow meter 36 is configured to measure the flow of fluid through recirculation conduit 32 and may indicate when a desired recirculation rate has been achieved.

In some embodiments (not shown in FIG. 1.), membrane filter unit 28 may be submerged in a side tank fluidly connected to reactor tank 20, and recirculation conduit 32 may fluidly connect a top end and a bottom end of the side tank with recirculation pump 34 disposed in recirculation conduit 32. In other embodiments, membrane filter unit 28 may be submerged in the top portion of settling tank 14, and recirculation conduit 32 may fluidly connect a top end and a middle end of settling tank with recirculation pump 34 disposed recirculation conduit 32.

A permeate storage tank 38 may fluidly communicate with membrane filter unit 28 in reactor tank 20 via a permeate feed conduit 40. Over time, membrane filter unit 28 may collect particles and become plugged, thereby reducing its permeability and its effectiveness. Thus, a permeate feed pump 42 may be fluidly connected to permeate feed conduit 40 between permeate storage tank 38 and membrane filter unit 28 for periodically pumping permeate into membrane filter unit 28 to release trapped particles. Permeate feed pump 42 may be motor-driven and may be a peristaltic pump or any other suitable pump known in the art.

Rotameters 44 may be connected to permeate feed conduit 40 to detect when permeate flow rate is reduced, which may indicate that membrane filter unit 28 is clogged. One-way check valves 46 may be installed upstream of each rotameter 44, Pressure transducer 48 may also be connected to permeate feed conduit 40 to determine a transmembrane pressure drop (TMP) across the membrane filter unit 28, which may indicate that membrane filter unit 28 is plugged. A frequency controller 50 may be configured to communicate with rotameters 44, pressure transducer 48, and permeate feed pump 42. Frequency controller 50 may regulate a permeate feed rate by controlling permeate feed pump 42 based on signals from rotameters 44 and pressure transducer 48.

Figure 2:
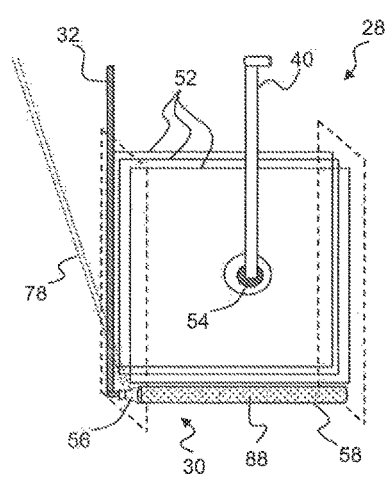
FIG. 2 is a schematic illustration of an exemplary disclosed membrane filter unit and aeration device that may be used in conjunction with the membrane bioreactor system of FIG. 1.

FIG. 2 illustrates an exemplary membrane filter unit 28 within reactor tank 20 that may be used in conjunction with MBR system 10 of FIG. 1. Membrane filter unit 28 may be submerged in mixed liquor, wastewater, or a combination thereof. Membrane filter unit 28 may include one or more membrane sheets 52 spaced apart and generally parallel with each other. Membrane sheets 52 may, for example, include polyacrylic, polyolefin, or polysuifone sheets and may include a flat sheet membrane (i.e. Microdyn Nadir). In one embodiment, for example, a flat sheet membrane including a surface area of 0.34 $m^2$ and an average pores size of 0.04 µm may be used. However, it is contemplated that membrane sheets 52 may be any suitable membrane sheet or other type of membrane filter known to a person of ordinary skill in the art, with a wide range of membrane areas per sheet being possible and a variety of membrane construction materials as listed above. For instance, it is contemplated that MBR system 10 may alternatively incorporate a hollow fiber membrane bundle instead of flat sheet membranes.

Membrane filter unit 28 may be fluidly connected to permeate storage tank 38 (referring to FIG. 1) via permeate feed conduit 40. An outlet 54 of permeate feed conduit 40 may be connected to at least one membrane sheet 52, as seen in FIG. 2. Aeration device 30 may be positioned below membrane filter unit 28 in order to permit aerated wastewater to pass generally vertically along membrane sheets 52.

Aeration device 30 may be disposed within reactor tank 20 below membrane filter unit 28. However, it is contemplated that aeration device 30 may be positioned at other locations in reactor tank 20. For example, aeration device 30 may be disposed substantially near top end 24 or substantially near bottom end 26 of reactor tank 20. Although FIG. 2 depicts aeration device 30 in a generally horizontal configuration, aeration device 30 may be vertically oriented, either facing upward or downward. Aeration device 30 may include an eductor 56 and a perforated tube 58. Eductor 56 may be configured to mix air with mixed liquor and wastewater to produce bubbles, while perforated tube 58 may be configured to distribute the air and wastewater mixture and bubbles uniformly throughout membrane sheets 52. If desired, aeration device 30 may include a plurality of educators 56 to provide additional mixing of air and wastewater and aeration within reactor tank 20. In another embodiment, reactor tank 20 may comprise multiple aeration devices 30 and multiple membrane filter units 28 to efficiently treat larger quantities of wastewater.

Figure 3:
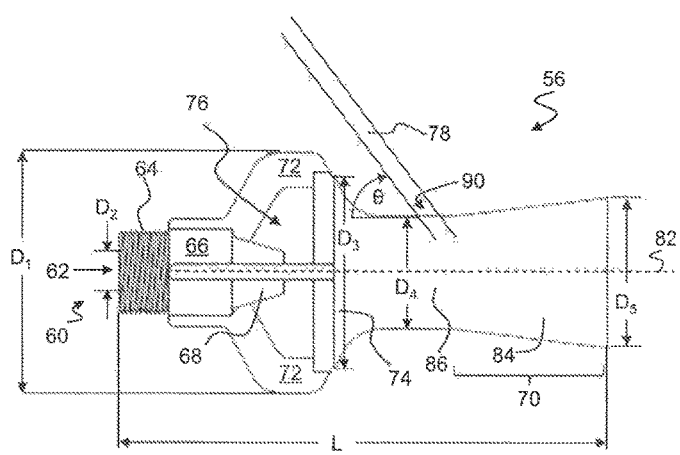
FIG. 3 is a schematic illustration of an exemplary disclosed eductor that may be used in conjunction with the membrane bioreactor system of FIG. 1.

FIG. 3 illustrates an exemplary eductor 56 that may be used in conjunction with MBR system 10 of FIG. 1. Eductor 56 may be generally cylindrically-shaped with an overall diameter $D_1$ and a length L. Eductor 56 may be fluidly connected at a first inlet 60 to recirculation conduit 32 (referring to FIG. 1) for receiving wastewater pumped from top end 24 of reactor tank 20 by recirculation pump 34. First inlet 60 may include an inlet bore 62 having a diameter $D_2$ for receiving pressurized fluid into eductor 56. Eductor 56 may be mechanically connectable to recirculation conduit 32 at first inlet 60 via any suitable mechanical connection such as, for example, pipe threads 64 around an outer surface of first inlet 60, as depicted in FIG. 3. First inlet 60 may have a cylindrical middle section 66 between pipe threads 64 and a jet end 68. Jet end 68 of first inlet 60 may be spaced apart from and direct pressurized fluid towards a generally cylindrically-shaped mixing channel 70 of eductor 56. Mixing channel 70 may have an axially divergent geometry in some embodiments. Mixing channel 70 may be connected to first inlet 60 via a plurality of fins 72 extending from middle section 66 of first inlet 60 to a flared inlet region 74 of mixing channel 70.

A second inlet 76 may be defined by a space between jet end 68 of first inlet 60 and flared inlet region 74 of mixing channel 70. Second inlet 76 may fluidly connect eductor 56 at mixing channel 70 to wastewater proximately surrounding eductor 56. In this configuration, fluid flow from jet end 68 into mixing channel 70 may create a localized pressure drop in second inlet 76 that draws wastewater proximately surrounding eductor 56 into mixing channel 70. In this configuration, first inlet 60 and second inlet 76 may be generally concentric.

An air conduit, such as air tube 78, may extend from an ambient air source 80 (see FIG. 1) into mixing channel 70 at third inlet of eductor 56, such as air inlet 90. In this configuration, eductor 56 may be configured to be in fluid communication with ambient air source 80 so that air may be drawn into eductor 56 during operation of MBR system 10. For example, air tube 78 may be configured to draw air from ambient air source 80 when a velocity of fluid in mixing channel 70 passing air tube 78 creates a localized pressure drop. Air tube 78 may be of any suitable construction, such as a polypropylene tube, and may be inserted into mixing channel 70 and oriented at an angle θ of about 0-90° (i.e. 45°) with respect to a centerline 82 of eductor 56. Centerline 82 may be generally parallel with a flow path through eductor 56.

Mixing channel 70 may further include a flared outlet region 84 and a neck region 86 between flared inlet and outlet regions 74 and 84. Flared inlet region 74, neck region 86, and flared outlet region 84 may each have a diameter $D_3$ (i.e. about 18 mm), $D_4$ (i.e. about 15 mm), and $D_5$ (i.e. about 18 mm), respectively.

Flow characteristics through eductor 56 may be affected by the measurements of diameters $D_1$-$D_5$ and length L as well as the flow rate of recirculated wastewater pumped into eductor 56. Accordingly, diameters $D_{1-5}$ of eductor 56 may be sized according to particular system constraints and operating parameters. For example diameters $D_{1-5}$ may be sized based on a desired recirculation rate in reactor tank 20, a desired inlet flow rate into eductor 56, how many educators are to be used, and a volume of reactor tank 20.

Use of eductor 56 has been empirically determined to surprisingly achieve desirable flow characteristics leading to improved membrane fouling mitigation. For example, use of eductor 56 may extend a period of time before membrane sheets 52 become clogged, as compared to conventional aeration devices, while also permitting high recirculation rates. Thus, it may be possible to use eductor 56 to mitigate membrane fouling in relatively larger systems that require high recirculation rates within reactor tank 20.

Referring again to FIG. 2, perforated tube 58 may be fluidly connected at a proximal end to flared outlet region 84 of eductor 56. A distal end of perforated tube 58 may be closed, and therefore configured to direct fluid exiting eductor 56 through perforated holes 88. Perforated holes 88 may have diameters of about 1 mm, but may alternatively have any suitable diameter for channeling fluid and bubbles exiting eductor 56 throughout membrane sheets 52. Perforated tube 58 may include interior baffles (not shown in FIG. 2) to improve fluid channeling.

It will be apparent to those skilled in the art that various modifications and variations can be made to the disclosed MBR system. Other embodiments will be apparent to those skilled in the art from consideration of the specification and practice of the disclosed MBR system. It is intended that the specification and examples be considered as exemplary only, with a true scope being indicated by the claims included with this specification and their equivalents Industrial Applicability The disclosed eductor-based MBR system may be applicable in wastewater treatment processes to improve membrane fouling mitigation where high rates of recirculation are required. The disclosed eductor-based MBR system 10 may promote back-transport of trapped particles from membrane filters by producing relatively large bubbles while permitting high rates of recirculation using an aeration device that incorporates an eductor. Operation of MBR system 10 incorporating eductor 56 will now be discussed.

Wastewater may accumulate in feed tank 12 for subsequent treatment in MBR system 10. Pump 16 may move wastewater from feed tank 12 into one or more settling tanks 14 located on a roof of a building that houses MBR system 10. Under the force of gravity or additionally supplied force, wastewater from settling tanks 14 may travel through feed conduit 22 to a valve actuated by float switch 18 to open or close when a wastewater level in reactor tank 20 becomes too low or too high.

Membrane filter unit 28 within reactor tank 20 may reduce a particle content of wastewater by trapping and accumulating particles in membrane sheets 52. Particles may reach membrane sheets 52 by adhering to upwardly-moving bubbles generated by aeration device 30 below membrane filter unit 28. Aeration device 30 may generate bubbles by mixing ambient air with wastewater within reactor tank 20.

Waste water may be supplied to aeration device 30 via recirculation conduit 32. Wastewater from top end 24 of reactor tank 20 may he drawn into recirculation conduit 32 via recirculation pump 34. Recirculation pump 34 may force recirculated wastewater into aeration device 30. First inlet 60 of eductor 56 may accept recirculated waste water which then passes into mixing channel 70 of eductor 56. A velocity of wastewater exiting jet end 68 may create a localized pressure drop at second inlet 76 between jet end 68 and flared inlet region 74 of mixing channel. The localized pressure drop may draw wastewater proximately surrounding eductor 56 into aeration device 30. Second inlet 76 may accept wastewater proximately surrounding eductor 56 into mixing channel 70. In this configuration, wastewater proximately surrounding aeration device 30 may be drawn into aeration device 30 at a higher rate by increasing a rate of wastewater recirculation through recirculation conduit 32.

A velocity of wastewater from jet end 68 and second inlet 76 may create a localized pressure drop near air tube 78 in neck region 86 of mixing channel 70. Due to the localized pressure drop, ambient air may be drawn into aeration device 30. Air inlet 90 may accept ambient air from ambient air source 80 via air tube 78 oriented between about 0-90° with respect to centerline 82 of eductor 56. Centerline 82 may be generally parallel with a flow path through eductor 56. In this way, wastewater and air may mix within mixing channel 70 to produce a mixed flow of wastewater and generate bubbles. Desired flow rates of air through air tube 78 and effective bubble sizes may be achieved by eductor 56 having ratios relating to diameters $D_1$-$D_5$ and length L. In this configuration, ambient air may be drawn into aeration device 30 at a higher rate by increasing the rate of wastewater recirculation through recirculation conduit 32.

A mixture of wastewater and air including bubbles may pass through flared outlet region 84 of mixing channel 70 and pass into a perforated tube 58. Perforated tube 58 may guide wastewater and bubbles such that bubbles exiting aeration device 30 through perforated holes 88 are channeled throughout membrane sheets 52 located above perforated tube 58. In this way, bubbles may rise and promote back-transport of particles trapped by membrane sheets 52 in membrane filter unit 28. Particularly, particles may be removed from the surface of membrane sheets 52 by adhering to upwardly-moving bubbles that rise past the membrane surface, thereby improving mitigation of membrane fouling during operation of MBR unit 10.

Over a period of time, particle accumulation on membrane sheets 52 may reduce membrane permeability and membrane effectiveness, thereby requiring permeate backwashing. Permeate stored in permeate storage tank 38 may be drawn by permeate feed pump 42 into membrane sheets 52 via permeate feed conduit 40. Frequency controller 50 may govern permeate feed pump 42, based on a transmembrane pressure (TMP) value and permeate flow rate values communicated by pressure transducer 48 and rotameters 44, respectively. In this way, permeate may be pumped through membrane sheets 52 to detach particles accumulated thereon and to improve membrane effectiveness,

EXAMPLES

To understand the ways in which using eductor 56 improves MBR system performance, the performance of an MBR system using a typical diffuser was compared with the performance of the same MBR system using eductor 56. Aspects of performance included aeration and oxygenation, membrane fouling, wastewater treatment efficiency at different hydraulic retention times (HRTs) (12, 10, 8 and 6 h), and energy consumed to deliver air to the membrane unit using a centrifugal pump (for eductor 56) and an air compressor (for the diffuser). The experimental protocol consisted of two main segments: (1) operation with the inbuilt diffuser and (2) operation with the eductor 56. A study of aeration and oxygenation was further divided into three segments, namely (a) a study of the rate of air drawn through the eductor 56 at various mixed liquor recirculation rates with the eductor positioned near the surface (5 cm water depth) and at a depth of 40 cm below the surface (this was a specific study performed using only the eductor), (b) a study of oxygen transfer rate study using both the eductor and the typical diffuser, and (c) a study of the dissolved oxygen (DO) profile at different locations of the tank. Experiments using the typical diffuser were performed first followed by experiments using eductor 56 instead of the diffuser.

Figure 4:
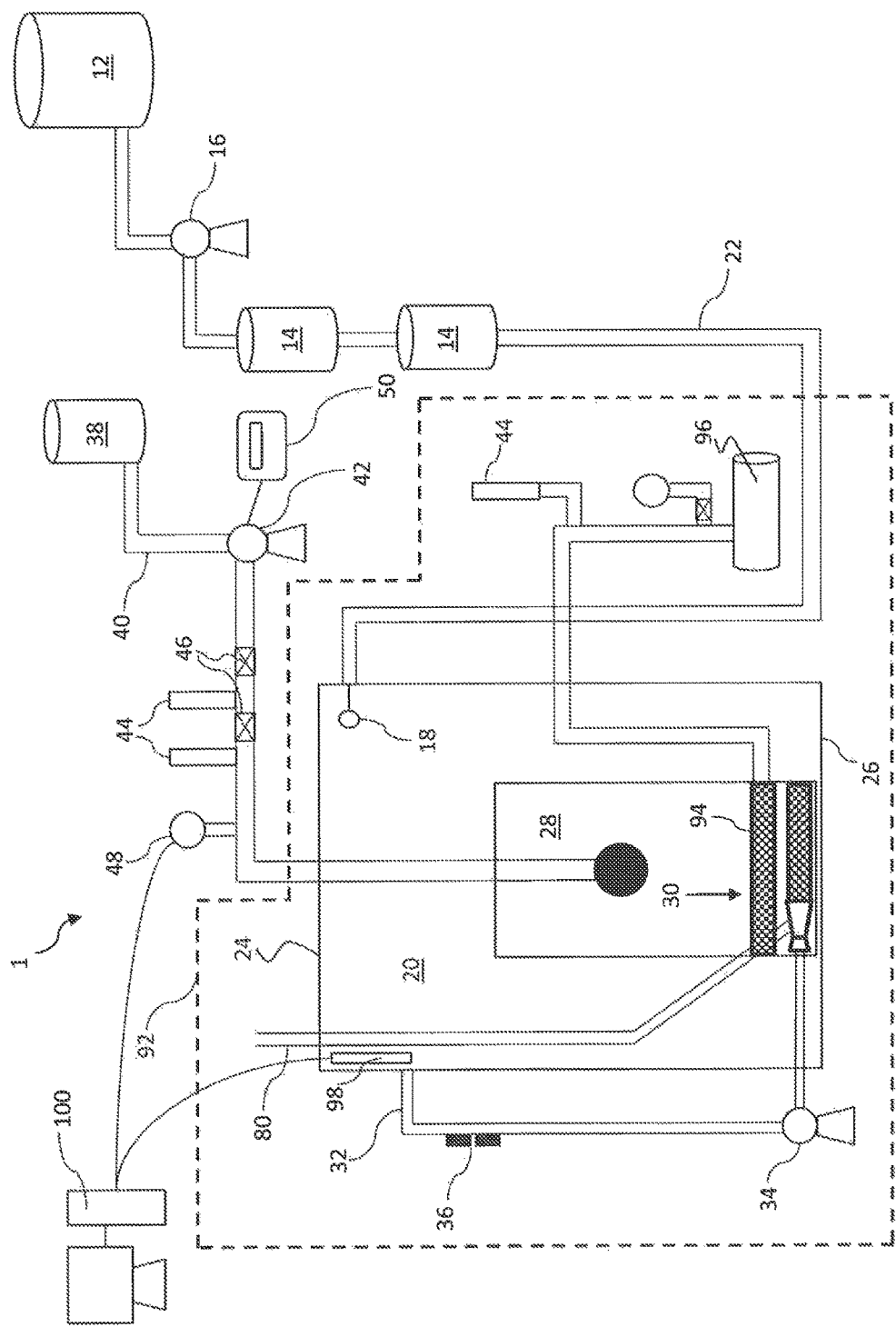
FIG. 4 is a schematic illustration of an MBR test apparatus according to the present disclosure.

FIG. 4 shows a diagrammatic illustration of an MBR test apparatus 92 used in conjunction with the following analysis. The MBR test apparatus 92 includes similar, components as MBR system 10 of the present disclosure, and like numbers are used to represent like components. Reactor tank 20 was rectangular in shape and was made up of polyacrilic sheets with an effective volume of 75 L. A flat sheet membrane of polysulfone (Microdyn Nadir) of 0.34 $m^2$ membrane surface area with an average 0.04µ of pore size was immersed inside the tank. The membrane unit was equipped with an inbuilt diffuser 94 fed by a compressor 96 to aerate the membrane. Test apparatus 92 included a DO meter 98 within reactor tank 20 and a data recorder, such as computer 100, in electronic communication with DO probe 98 and pressure transducer 48. Testing of a typical diffuser was performed using an inbuilt diffuser 94 of membrane unit 28. For tests using eductor 56, inbuilt diffuser was substituted with eductor 56 having air tube 78 and perforated tube 58, and air compressor 96 was disabled.

Experimental conditions were kept nearly the same for both cases. Activated, sludge was collected from the municipal wastewater treatment plant from Yeroham, Israel. For each test, activated sludge was poured into the MBR and was acclimated with a constant permeation-backwashing mode of operation (10 min permeation and 30 sec backwash) at 12 h of hydraulic retention time (HRT) with 5 liters per minute (L/min) of aeration (through the diffuser). The backwashing was done at a flow rate of 150 mL/min. The aeration rate was fixed at 5 L/min (per the specification of Microdyn Nadir Company) for both test, segments. The average mixed liquor suspended solids (MLSS) concentration was kept around 5.5-6.5 g/L throughout the study except where specified.

During the oxygen transfer rate study for both the experimental segments the air supply was stopped initially to reduce the DO concentration to <2 mg/L and then again started at a rate of 5 L/min. The DO probe continuously measured the changes in the DO concentration at 30 second intervals.

The oxygen uptake rate (OUR) was measured ex-situ (EPA method for Specific Oxygen Uptake Rate in Biosolids, 2001). The mixed liquor from the MBR was transferred to a biochemical oxygen demand (BOD) bottle up to its neck and was placed on a magnetic stirrer. BOD is an amount of dissolved oxygen needed by aerobic biological organisms in a body of water to break down organic material. An optical DO probe (YSI environmental) was inserted inside the BOD bottle and the BOD bottle was ensured to be leak proof (not allowed atmospheric oxygen to enter inside the BOD bottle). The DO probe was connected to a computer which contentiously measured the DO depletion over a period of time. The data was recorded at 30 second intervals. The slope of the straight line of C (DO concentration, mg/L) against time gave the OUR value.

The overall oxygen transfer rate was calculated through the equation given bellow.

$$dC/dt = K_L a(C^* - C) - rX \quad (1)$$

Equation (1) is rearranged in the given form:

$$C = -1/K_L a(dC/dt + rX) + C^* \quad (2)$$

where C is the measured DO concentration, dC/dt is the rate of change of oxygen in the liquid phase, C* is the Do concentration at saturation, $K_L a$ is the volumetric oxygen transfer coefficient, t is the time, r is the specific oxygen uptake rate per unit biomass, X is the mass concentration of the biomass inside the tank. $K_L a$ was determined from the slope of the straight line obtained from a plot of C against dC/dt+rX. The value of $K_L a$ was converted to the standard temperature according to the equation (3) below, $$K_L a_{(T)} = K_L a_{(20°\ C.)} \times 1.024^{(T-20)} \quad (3)$$

MBR performance in terms of chemical oxygen demand (COD) and ammonia removals at different HRTs were studied. During this phase the MBR was operated in a permeation (5 min) and backwashing (30 sec, 150 mL/min) mode of operation followed by a pause (10 sec) in between. The influent and effluent samples were collected and analyzed in triplicate for pH, COD, $NH_4$—N, $NO_2$—N and $NO_3$—N and the average value were used for the data representation.

The pH, COD, $NH_4$—N, $NO_2$—N, $NO_3$—N and the MLSS concentration were measured as per standard methods, Aeration Study The aeration rate was fixed at 5 L/min (per the specification of Microdyn Nadir Company) for both test segments. Air inlet rates were measured through eductor 56 at different mixed liquor recirculation rates at 40 cm depth (just beneath the membrane unit) of the water level and near the surface (5 cm water depth) (see FIG. 5). It was observed that to draw 5 L/min of air from the atmosphere at a depth of 40 cm, a recirculation rate of 12.6 L/min of mixed liquor having an inlet pressure of 0.7 bar was required. It is interesting to note that at higher rate of wastewater recirculation rate (recirculation rate 14.8 L/min, inlet pressure 1 bar) the rate of air inlet was found to be increased (10 L/min) which means that not only the water recirculation rate through eductor 56, but the inlet pressure of the water also plays a significant role in the net air suction rate.

Figure 5:
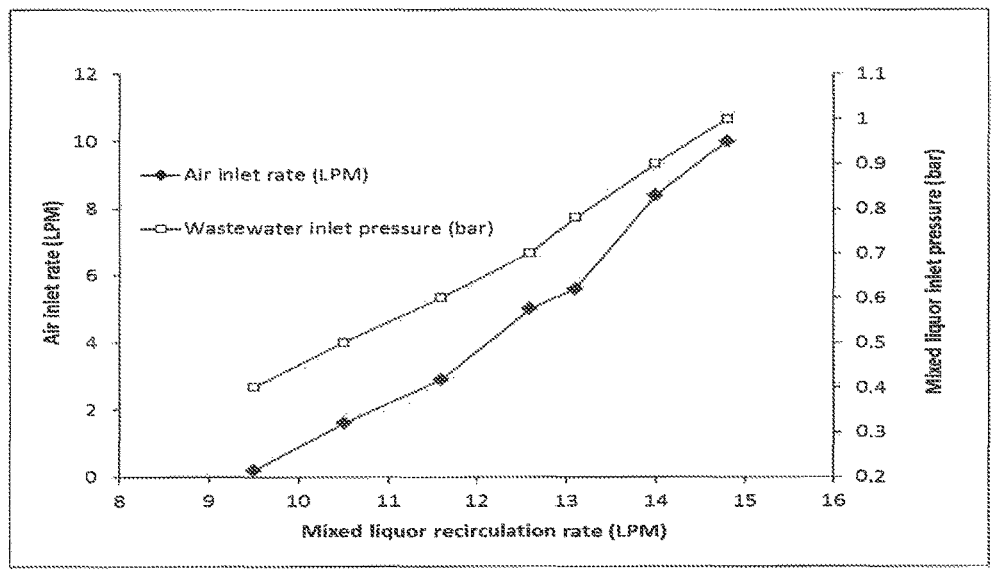
FIGS. 5 and 6 show air inlet rates for the test apparatus of FIG. 4 as a function of mixed liquor recirculation rate.
Figure 6:
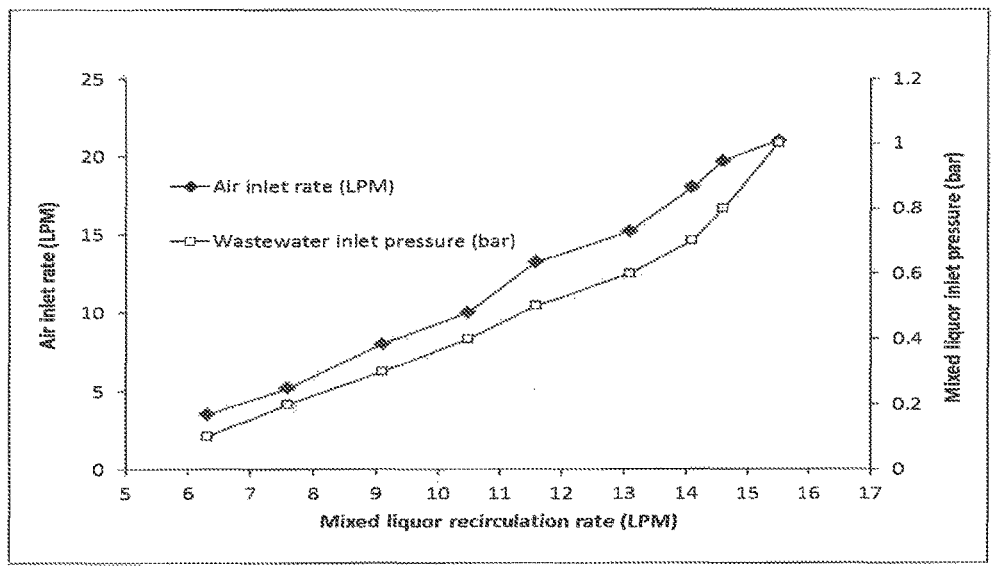

In a second test eductor 56 combined with the perforated tube was placed at a depth of 5 cm inside the MBR tank, and it was found that at each recirculation rate the air inflow rate was greater than the previous experiment at a water depth of 40 cm (see FIG. 6). FIG. 5 shows that in order to draw 5.2 L/min of air from the atmosphere, 7.6 L/min of mixed liquor must be recirculated through the eductor 56 as compared to 12.6 L/min when the eductor 56 was submerged 40 cm below the surface.

Oxygen Transfer Rate Study

Figure 7:
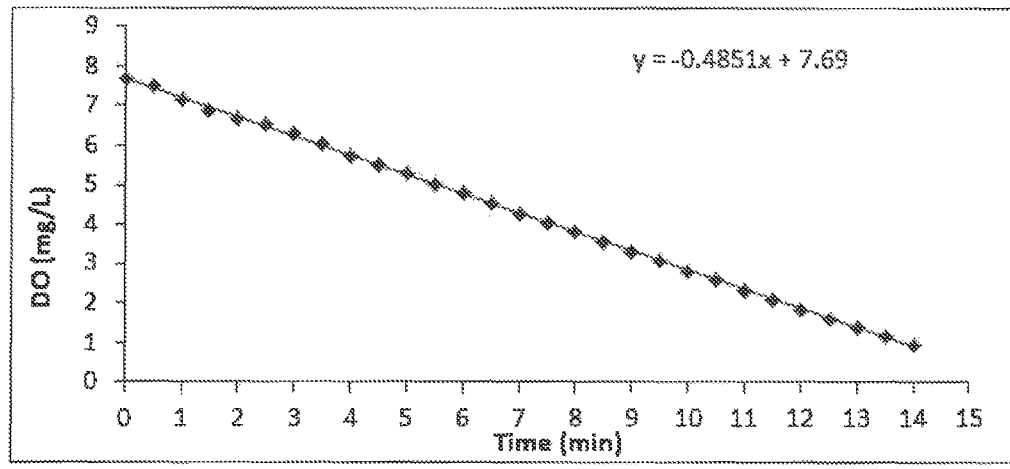
FIG. 7 shows an oxygen uptake rate for the test apparatus of FIG. 4.
Figure 8:
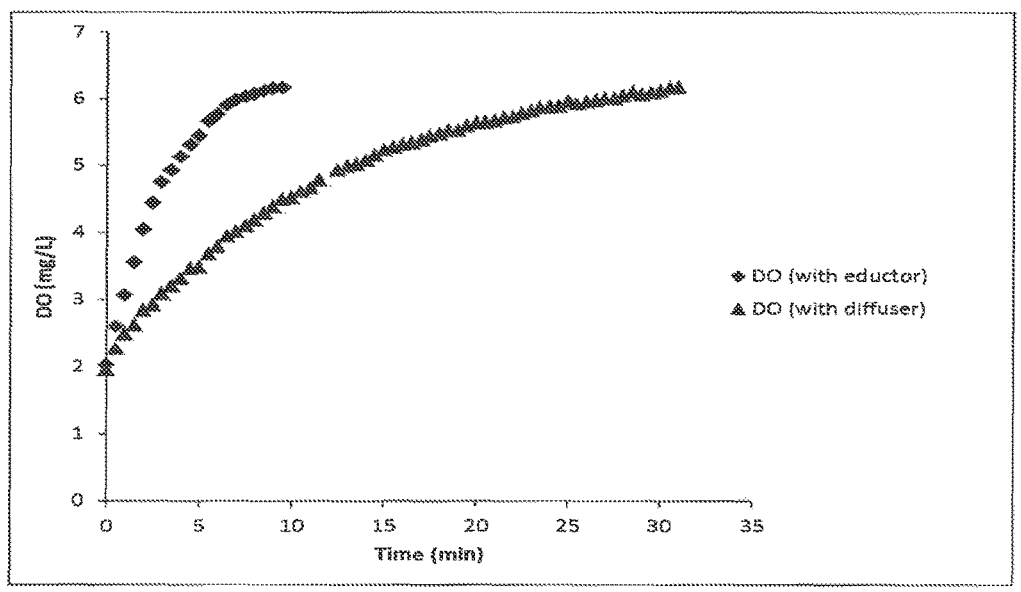
FIG. 8 shows changes in dissolved oxygen concentrations with respect to time for the apparatus of FIG. 4 when used with an eductor of the present disclosure and with a diffuser.

Oxygen transfer rates using eductor 56 and diffuser 94 were studied. The oxygen uptake rate (OUR) was measured first in ex-situ condition and was obtained from the slope of the DO depletion with respect to time, as seen in FIG. 7 (OUR=0.49 mg DO/L/min). Incorporating this value into equation (2), the values of $K_L a$ for diffuser 94 and eductor 56 were determined. Using equation (3), at the standard temperature, the $K_L a$ values were found to be 4.17/h and 16.81/h respectively for diffuser 94 and the eductor 56. FIG. 8 shows how fast the DO concentration increased with eductor 56 compared to diffuser 94. This speed may be the result of a high degree of mixing (mixed liquor and air) at the throat of eductor 56.

DO Profile Study

Figure 9:
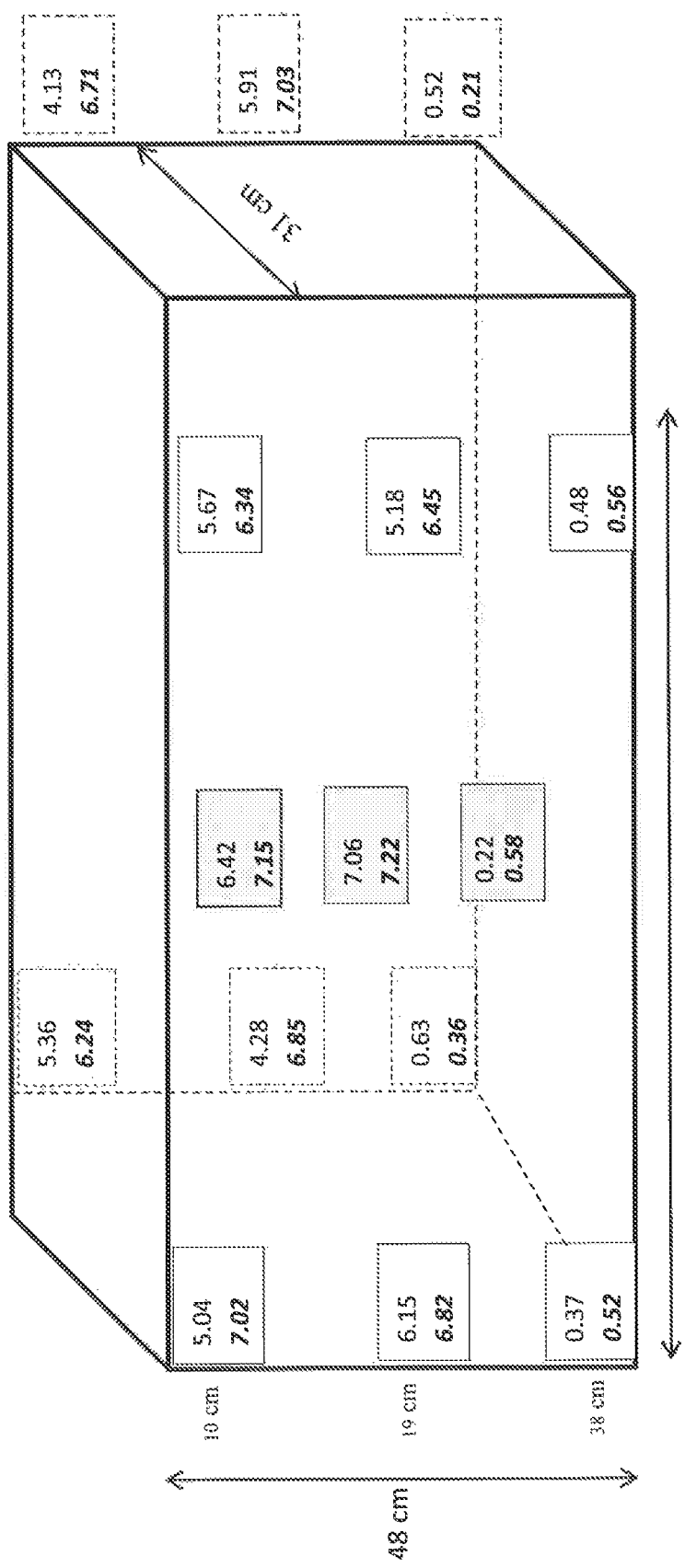
FIG. 9 shows a dissolved oxygen profile at various locations in the apparatus of FIG. 4.
Figure 10A:
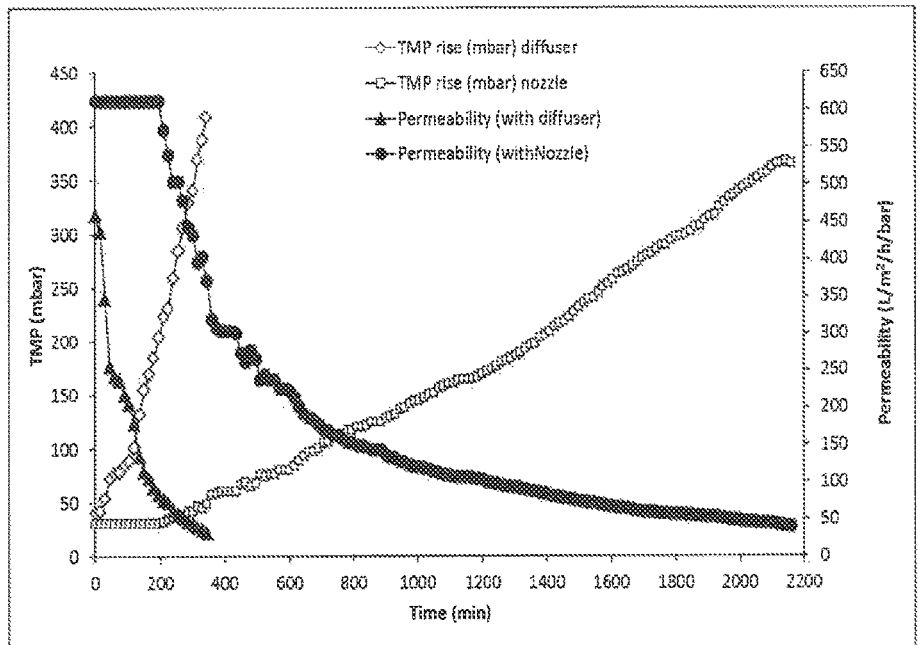
FIGS. 10a-d and 11 show transmembrane pressures with respect to time at various fluxes for a filter membrane in the apparatus of FIG. 4 when used with an eductor of the present disclosure and/or when using a diffuser.
Figure 10B:
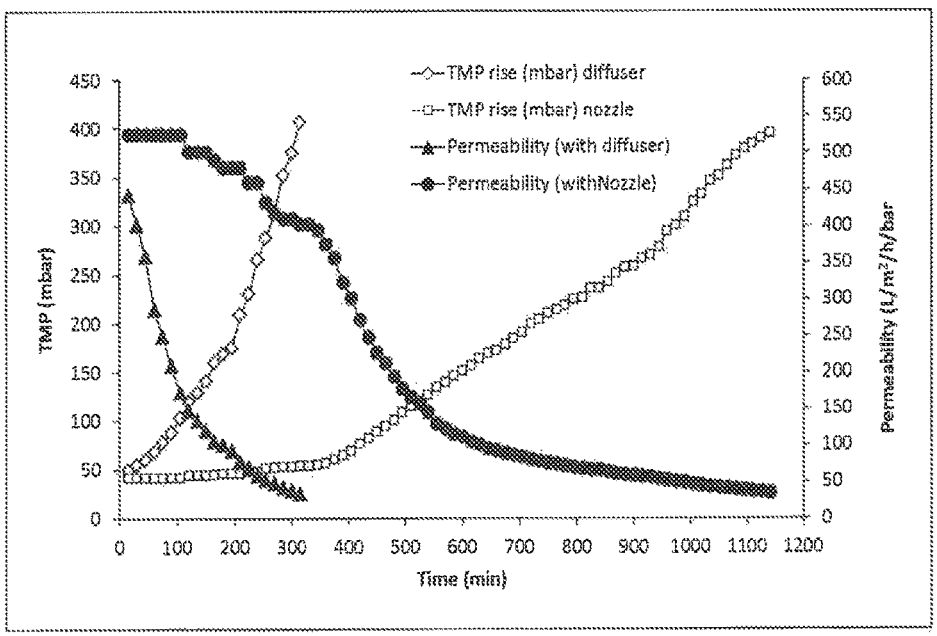
Figure 10C:
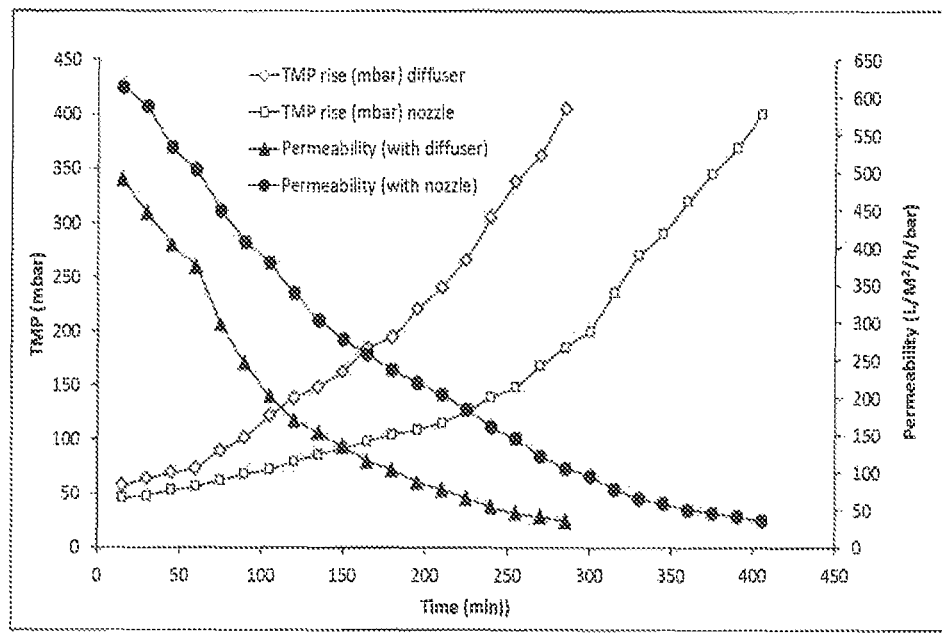
Figure 10D:
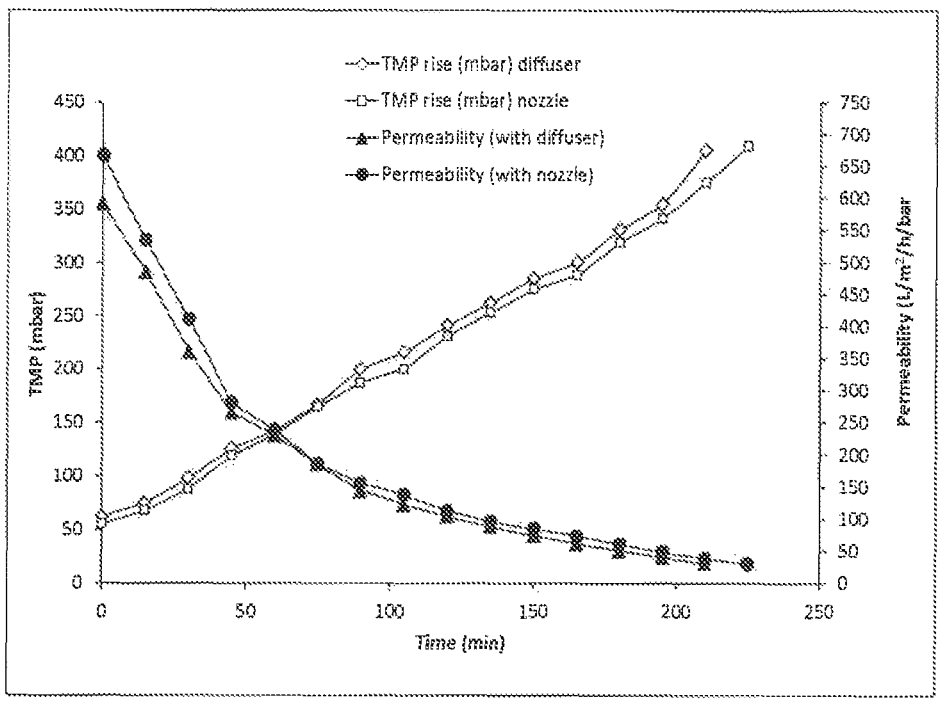

A comparative DO profile of the MBR was studied with eductor 56 and with the diffuser 94. The aeration rate was fixed at 5 L/min with both diffuser 94 and eductor 56, and the wastewater feeding was stopped for that time. The temperature was found to be 25±0.5. The DO probe was immersed at the corners of reactor tank 20 at different water depths (10, 19 and 38 cm). The DO values in the solid lined boxes of FIG. 9 are the DO of the front side of reactor tank 20 whereas the dashed boxes show the DO values at the back side of reactor tank 20. The DO probe was also immersed through the membrane unit (center of the tank; at a distance of 27 cm from the sidewall, and 15.5 cm from the front/back wall) and the readings were recorded at 10, 19 and 38 cm of water depth (the DO values of which are depicted in the gray colored boxes). The DO values obtained using eductor 56 are shown in bold italic font whereas the DO values using diffuser 94 are shown in the regular font in FIG. 9.

FIG. 9 shows that the DO profile of the MBR varied at different locations and at various depths when using either eductor 56 or diffuser 94. The top and the middle of reactor tank 20 showed relatively high DO concentrations whereas the bottom layer of the reactor tank 20 was found to have a lower DO concentration for both tests. Low DO values in the bottom layer could be caused by highly oxygenated water being pulled through regions of high biomass as it moves from an area of highly concentrated mixing to areas of relatively low mixing or stagnant regions. In these stagnant regions, oxygen uptake is high and addition of oxygen to water is low, resulting in low DO levels.

DO values at the top and the middle/center of the MBR tank were found to be slightly higher with eductor 56 compared to diffuser 94. Further, the DO the distribution at the top and the middle zone of reactor tank 20 was found to be more homogeneous with eductor 56 (mean DO=6.8±0.34 mg/L) than with diffuser 94 (DO=5.52±0.92) mg/L. Homogeneous DO distribution could be the result of the high oxygen transfer rates and the adequate mixing of mixed liquor with air inside reactor tank 20 when using eductor 56 in comparison to diffuser 94.

Membrane Fouling Study

Membrane fouling was studied by running the MBR at different fluxes (18.35, 22.1, 28.24 and 36.70 L/m$^2$/h) and recording how long the system took to reach a TMP of 400 mbar, which represented maximum fouling limit for purposes of the study. Membrane permeability with respect to time was also recorded as an indication of membrane fouling. After each test, the membrane was taken out of the tank and was cleaned in a NaOCl—NaOH solution followed by a citric acid solution for 3-4 h. The membrane was cleaned with the fresh water and was immersed inside the tank for the next study.

Table 1 summarizes the data of the membrane fouling study. Table 1 indicates that at each flux, the time taken to reach a TMP of 400 mbar while using diffuser 94 was less than that of eductor 56. Moreover, when using eductor 56, membrane permeability decreased at a much lower rate than with diffuser 94 (see FIGS. 10a-d). Accordingly, use of eductor 56 showed improved membrane fouling control over use of diffuser 94. This improvement may be attributed to the creation of higher velocities of liquid and air through the membranes by educator 56, which lead to improved mixing and bubble generation. Improved bubbled generation and higher velocity may lead to higher shear force across the membrane surface, thereby improving fouling control.

To better understand how eductor 56 achieved improved results, another test was performed using eductor 56 with perforated tube 58 (referring to FIG. 3), but without air tube 78 (referring to FIGS. 2-3), in combination with diffuser 94. Both diffuser 94 and eductor 56 were used simultaneously at a flux of 28.24 L/m²/h. Without air tube 78, there was no air flow through eductor 56. Thus, eductor 56 served only as a mixing nozzle of re-circulated mixed liquor in reactor tank 20. The only source of the air was the air through diffuser 94 at a rate of 5 L/min. The MLSS concentration was kept at ~5.5 g/L.

Figure 11:
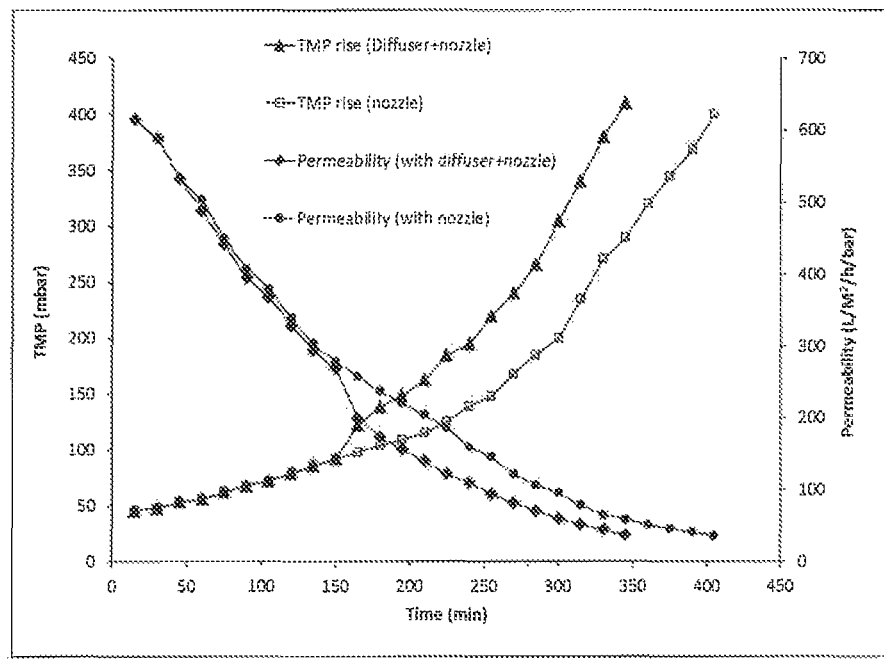

In this test, the amount of time taken to reach a TMP of 400 mbar was observed to be greater than in the test using only diffuser 94 (see FIG. 11 and Table 1). These results suggest that improved fouling resistance achieved when using eductor 56 may be attributed to the increased recirculation flow rate in addition to improved bubble generation.

Figure 12:
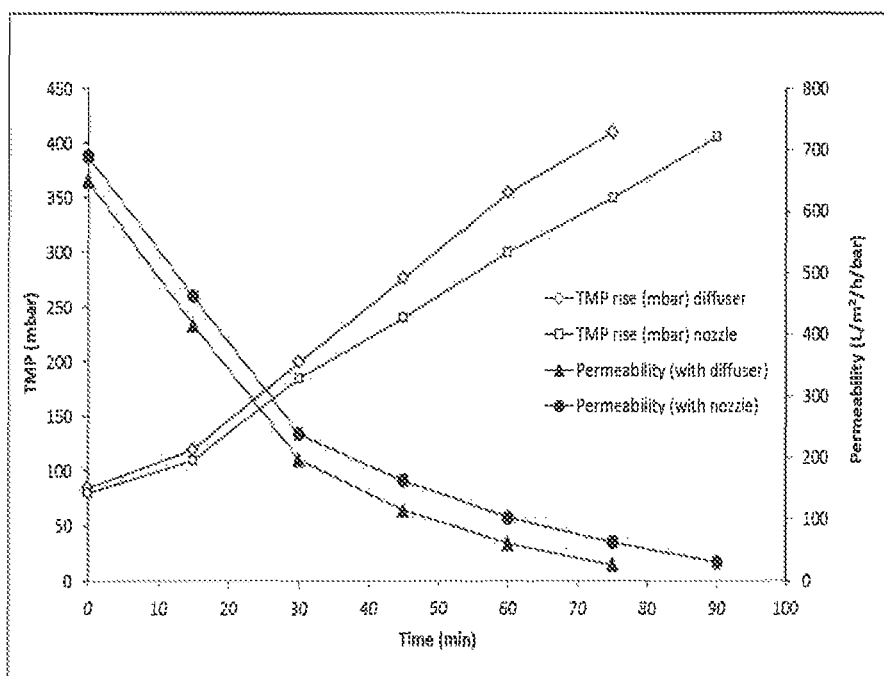
FIG. 12 shows transmembrane pressures with respect to time for a filter membrane in the apparatus of FIG. 4 when operated above a critical flux.

Table 1 also shows that at higher flux (36.70 L/m²/h), both diffuser 94 and eductor 56 took almost same time to reach to the threshold TMP (400 mbar). At higher flux, the rate of deposition of fouling materials on the surface of the membrane may be greater than the rate of fouling reduction that can be achieved using either eductor 56 or diffuser 94 at the given air flow rate (5 L/min in this test). A flux at which eductor 56 is substantially as effective as another type of aeration device (i.e. diffuser 94), and below which eductor 56 is substantially more effective, may be referred to as a critical flux. It is generally desirable to operate the MBR below a critical flux in order to realize improved membrane fouling mitigation using eductor 56. Thus, to more accurately identify the critical flux of eductor 56, membrane fouling at 56.48 L/m²/h and 10 g/L of MLSS content was tested. As expected, even lower fouling times for both diffuser 94 and eductor 56 were achieved. It is noted, however, that even when the MBR was operated with eductor 56 at high flux, slightly better performance was achieved than with diffuser 94 (see FIG. 12).

TABLE 1

Time to reach 400 mbar TMP

| Initial flux (L/m²/h) | Diffuser Time (h) | Eductor Time (h) | Diffuser Time (h) with Eductor (without air tube) |
|---|---|---|---|
| 18.35 | 5.7 | >36 | — |
| 22.1 | 5.2 | 19 | — |
| 28.24 | 4.8 | 6.8 | 5.6 |
| 36.70 | 3.2 | 3.5 | — |
| 56.48 | — | — | — |

Performance Study at Different HRTs

Figure 13:
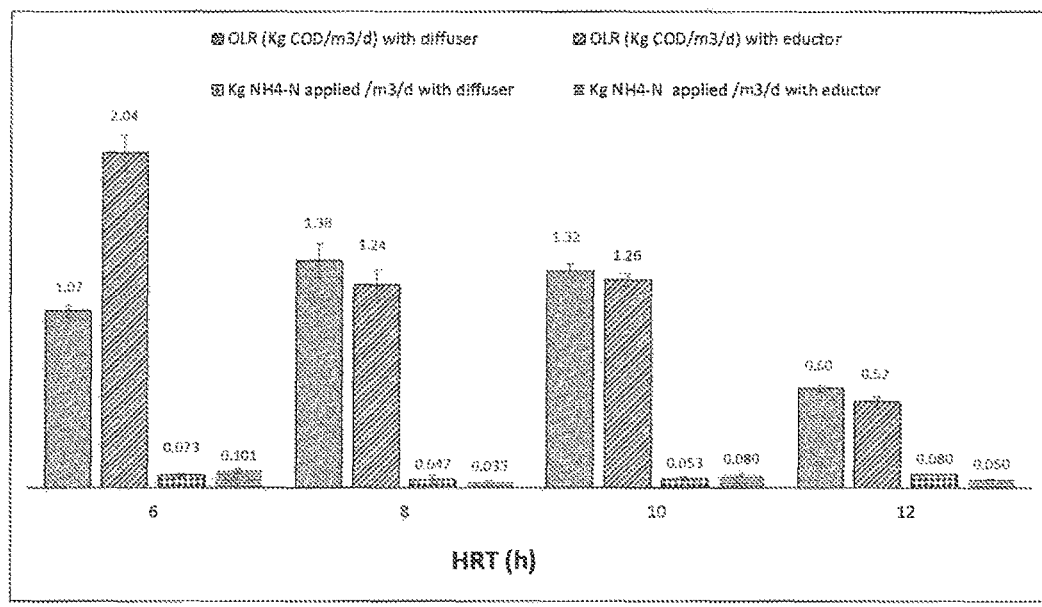
FIGS. 13 and 14 show chemical oxygen demand and ammonia loading and removal rates at varied hydraulic retention times.
Figure 14:
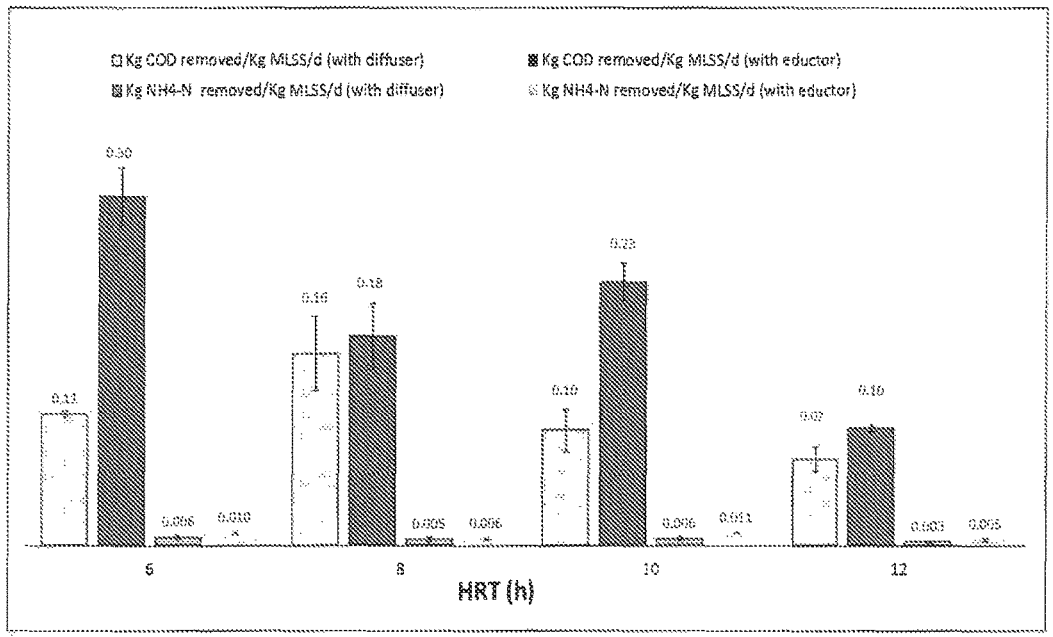

After completion of the membrane fouling study, performance of the MBR was tested at different HRTs (12, 10, 8 and 6 h). Performance of the MBR was evaluated in terms of COD and ammonia removal. FIG. 13 shows COD and ammonia loading rates at different HRTs. The experiment was conducted using real wastewater, which accounts for variations in the COD and ammonia loading rates at different phases of the study. FIG. 14 shows the performance of the MBR. In terms of COD and ammonia removal.

FIG. 14 shows that at every HRT the MBR showed slightly better COD and ammonia removal when operated with eductor 56 than with diffuser 94. The overall COD reduction of the MBR when operated with eductor 56 was found to be in the range of 93-96% at different organic loading rates, compared to 83-91% when operated with diffuser 94. It is noted that even at a short HRT (i.e. 6 h), use of eductor 56 led to a better COD removal efficiency (96%) compared with diffuser 94 (86%). This difference may be the result of greater mixing of mixed liquor and air by eductor 56, leading to improved contact among wastewater, air, and microorganisms. Further, a higher rate of mass transfer achieved with eductor 56 ($K_La$=16.81/h) than with diffuser 94 ($K_La$=4.17/h) may also have contributed to the high degree of organics removal.

Energy Requirement Study

Recirculation pump 34 was driven by 3-phase motors that were controlled by a frequency controller (Shenzhen Encom electric technologies Co., Ltd, ENC, EDS 800 series). The recirculation rate of mixed liquor through recirculation pump 34 was changed by modifying the frequency of the frequency controller. The frequency controller directly measured the amperage and the voltage of recirculation pump at a given flow rate (12,6 L/min).

The energy consumption of the compressed air was determined using standard adiabatic compression equation according to the following equation:

$$W=(k/k-1)*P_{out}*Q[(P_{out}/P_{in})^{(k-1/k)}-1] \quad (eq.4)$$

where, W is power in watts, K is a constant for air and is 1.399, $P_{out}$ is the outlet pressure of the compressor, Q is the air flow rate through the air supply conduit in m³/s, and $P_{in}$ is the inlet pressure of the compressor.

It was observed that for eductor 56 to recirculate 12.6 L/min of mixed liquor and draw 5 L/min of air it Look ~140 watts of electricity, whereas for compressed air it took ~2.6 watts to provide 5 L/min of air through diffuser 94. However, the power consumed when using eductor 56 includes the power to recirculate mixed liquor at 12.6 L/min, which is not included in the power consumed when using diffuser 94. This important distinction may suggest that improved cost efficiency can be achieved by operating the MBR with eductor 56 instead of with diffuser 94, especially in light of the test results explained above. Particularly, higher mixed liquor recirculation rates with improved membrane fouling mitigation were achieved using eductor 56, as seen in Table 1. Such an improvement in membrane fouling mitigation may lead to less frequent chemical cleaning and/or replacement of expensive membrane filters, thereby reducing the cost of operation. Further, increased air entrainment within the mixed liquor may be realized, as suggested by FIGS. 5 and 6, when greater than 5 L/min of air is permitted to be drawn into eductor 56. Accordingly, improved efficiency may be realized for larger MBR systems having larger tank volumes when inlet air through eductor 56 is unrestricted.

Some conventional wastewater treatment plants utilize large mixers to agitate wastewater in combination with a diffuser to aerate the system. Such a configuration is known to carry a high cost and occupy a large space. Further, large soak MBR systems are generally associated with high operating costs, largely due to the cost of membrane fillers and fouling mitigation. Thus, an MBR system according to the present disclosure may overcome the problems of known systems by mixing and aerating wastewater in the reactor tank using a single device, which may result in a reduced overall operational cost and occupy less space.

What is claimed is:

1. A process for treating domestic wastewater comprising:
   directing wastewater into a tank containing a membrane filter and mixed liquor;
   recirculating wastewater and mixed liquor from a top end of the tank into a bottom end of the tank via a recirculation conduit;
   introducing a flow of recirculated wastewater and mixed liquor from the top end of the tank into a mixing channel of an aeration device disposed in the tank via the recirculation conduit;
   drawing ambient air into the mixing channel of the aeration device using the flow of recirculated wastewater and mixed liquor from the recirculation conduit;
   drawing wastewater and mixed liquor proximately surrounding the aeration device into the mixing channel of the aeration device using the flow of recirculated wastewater and mixed liquor from the recirculation conduit; and
   generating bubbles in the mixing channel with the drawn wastewater, the recirculated wastewater, the drawn mixed liquor, and the drawn ambient air below the membrane filter.

2. The process of claim 1, wherein wastewater and mixed liquor are permeated through the membrane below a predetermined flux rate.

3. The process of claim 2, wherein the predetermined flux rate is between 25-30 L/m²/h.

4. The process of claim 1, wherein the aeration device includes an educator.

5. The process of claim 1, further including periodically pumping a permeate from a permeate storage tank into the membrane filter via a permeate feed conduit.

6. The process of claim 1, further including distributing an aerated mixture of wastewater and mixed liquor throughout the membrane filter.

7. The process of claim 1, wherein the flow of recirculated wastewater and mixed liquor from the recirculation conduit is introduced into the aeration device through a first inlet.

8. The process of claim 7, wherein the wastewater and mixed liquor proximately surrounding the aeration device are drawn into the aeration device through a second inlet.

9. The process of claim 8, wherein the ambient air is drawn into the aeration device through a third inlet.

10. A membrane bioreactor including:
    a reactor tank containing a membrane filter unit submerged in wastewater and mixed liquor;
    a recirculation conduit fluidly connecting a top end and a bottom end of the reactor tank;
    a recirculation pump disposed in the recirculation conduit;
    an aeration device disposed within the reactor tank and below the membrane filter unit, wherein the aeration device includes:
    a first inlet in fluid communication with the recirculation pump to receive a flow of recirculated wastewater and mixed liquor from the top end of the tank via the recirculation conduit;
    a second inlet in fluid communication with wastewater and mixed liquor proximately surrounding the aeration device;
    a third inlet in fluid communication with an ambient air source; and
    a mixing channel in communication with the first, second, and third inlets and configured to generate bubbles with the wastewater, the recirculated wastewater, the mixed liquor, and ambient air.

11. The membrane bioreactor of claim 10, wherein the aeration device includes an eductor.

12. The membrane bioreactor of claim 11, further including a perforated tube fluidly connected to an outlet region of the eductor.

13. The membrane bioreactor of claim 11, wherein the ambient air is drawn into the air inlet from the ambient air source via an air tube oriented at about 0-90° with respect to a centerline of the eductor.

14. The membrane bioreactor of claim 11, wherein the eductor includes a generally cylindrically-shaped mixing channel having a flared inlet region, a flared outlet region, and a neck region connecting the flared inlet region and flared outlet region.

15. The membrane bioreactor of claim 11, wherein the membrane filter unit includes a flat sheet membrane filter or a hollow fiber membrane.

16. A wastewater treatment plant comprising:
    a source of domestic wastewater fluidly connected to at least one settling tank;
    a reactor tank fluidly connected to the at least one settling tank and containing wastewater and mixed liquor;
    a recirculation conduit fluidly connecting a top end of the reactor tank to a bottom end of the reactor tank;
    a membrane filter unit disposed within the reactor tank; and
    an aeration device disposed within the reactor tank and below the membrane filter unit,
    wherein a mixing channel of the aeration device is configured to be in fluid communication with the recirculation conduit via a first inlet to receive a flow of recirculated wastewater and mixed liquor from the top end of the tank into the mixing channel, with wastewater proximately surrounding the aeration device via a second inlet, and with an ambient air source via a third inlet; and
    wherein the mixing channel is configured to generate bubbles with the wastewater, the recirculated wastewater, the mixed liquor, and ambient air.

17. The wastewater treatment plant of claim 16, further including a recirculation pump disposed in the recirculation conduit and in fluid communication with the first inlet of the aeration device.

18. The wastewater treatment plant of claim 16, further including:
    a permeate storage tank in fluid communication with the membrane filter unit via a permeate feed conduit; and
    a permeate feed pump disposed in the permeate feed conduit between the permeate storage tank and membrane filter unit.

19. The wastewater treatment plant of claim 16, further including a float switch generally located near the top end of the reactor tank and configured to regulate a flow of wastewater into the reactor tank from the at least one settling tank.

20. The wastewater treatment plant of claim 16, wherein the at least one settling tank may be configured to deliver wastewater to the reactor tank under the force of gravity.

* * * * *

UNITED STATES PATENT AND TRADEMARK OFFICE
CERTIFICATE OF CORRECTION

PATENT NO. : 10,392,279 B2  
APPLICATION NO. : 14/596544  
DATED : August 27, 2019  
INVENTOR(S) : Jack Gilron et al.

Page 1 of 1

It is certified that error appears in the above-identified patent and that said Letters Patent is hereby corrected as shown below:

In the Specification

Column 5, Line 26, "educators 56" should read -- eductors 56 --.

Column 6, Line 24, "how many educators" should read -- how many eductors --.

Column 11, Line 15, "educators 56" should read -- eductors 56 --.

In the Claims

Claim 4, Column 13, Lines 39-40, "device includes an educator" should read -- device includes an eductor --.

Signed and Sealed this  
Thirty-first Day of March, 2020

Andrei Iancu  
*Director of the United States Patent and Trademark Office*